(12) United States Patent
Gowreesunker

(10) Patent No.: US 9,310,919 B2
(45) Date of Patent: Apr. 12, 2016

(54) ADAPTIVE THRESHOLDING FOR TOUCH SCREEN INPUT

(71) Applicant: Texas Instruments Incorporated, Dallas, TX (US)

(72) Inventor: Baboo Vikrhamsingh Gowreesunker, San Francisco, CA (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 37 days.

(21) Appl. No.: 14/483,225

(22) Filed: Sep. 11, 2014

(65) Prior Publication Data

US 2016/0077641 A1 Mar. 17, 2016

(51) Int. Cl.
*G06F 3/041* (2006.01)

(52) U.S. Cl.
CPC .... *G06F 3/0412* (2013.01); *G06F 2203/04111* (2013.01)

(58) Field of Classification Search
CPC ....................................................... G06F 3/044
See application file for complete search history.

(56) References Cited

U.S. PATENT DOCUMENTS

2013/0176271 A1* 7/2013 Sobel ..................... G06F 3/041
                                                    345/174
2015/0261375 A1* 9/2015 Leigh .................... G06F 3/0416
                                                    345/174

OTHER PUBLICATIONS

Morse, B.S.;"Lecture 4: Thresholding"; Brigham Young University, 1998-2000; 5 pages.

* cited by examiner

*Primary Examiner* — Gerald Johnson
(74) *Attorney, Agent, or Firm* — John R. Pessetto; Frank D. Cimino

(57) ABSTRACT

An adaptive threshold approach is applied to detect true touch signals and filter out increased noise signals. More specifically, statistics regarding the signals from a touch screen are used to create a touch signal threshold that changes with the statistics of the touch signals. Accordingly, the threshold can automatically move higher in high noise situations and lower in low noise situations. So configured, fewer noise signals are erroneously interpreted as touches for the device associated with the touch screen.

13 Claims, 9 Drawing Sheets

ADAPTIVE THRESHOLDING FOR TOUCH SCREEN INPUT

TECHNICAL FIELD

This invention relates generally to determining whether and where a touch screen input device has been touched.

BACKGROUND

Electronic devices use a variety of devices for receiving input signals from users to control the devices' operations. Keyboards, mice, microphones, and cameras are all used to receive data for a variety of devices. In addition, touch screens are becoming ubiquitous as an input mechanism for various devices. Touch screens allow a user to tap or touch a screen, which touch is registered by the device as an input signal. A "touch" can be registered in a touch screen using a variety of technologies (resistive, surface acoustic wave, capacitive, infrared grid, infrared acrylic projection, optical imaging, dispersive signal technology, acoustic pulse recognition, and the like) including those where the surface of the touch screen need not be physically touched, i.e., a close pass can trigger signaling by the touch screen corresponding to a "touch" by a finger, stylus, or other touching item. The location of the touch on the touch screen typically corresponds to a particular input signal to which the device will respond.

With the increasing use of touch screens, especially in mobile devices, the touch screens themselves are exposed to a variety of electromagnetic environments. Thus, certain touch screens may output a variety of noise levels that may be registered by the device as a "touch" even though no touch was intended. To counter this problem, a threshold is typically applied such that a signal from the touch screen is not considered a "touch" unless the signal is above a particular threshold, as illustrated in FIG. 1. The signal 110 from the touch screen has noise level 120 and a high input level 130, which level 130 is considered to be a touch to the extent it is higher than the threshold level indicated by line 140. The static threshold approach, however, can fail in a high noise environment where the noise may often exceed the threshold, as illustrated in FIG. 2. Here, a high noise signal 210 is illustrated with the low noise signal 110. This example high noise signal 210 includes a large sinusoidal aspect such that the peaks X of the no-touch portions of the signal 210 exceed the threshold amount 140 and thereby are considered "touches" by the device even though it is clear that only the highest input signal portion 230 was an intended "touch" input for the device.

SUMMARY

Generally speaking, and pursuant to these various embodiments, an adaptive thresholding approach is applied to detect true touch signals and filter out increased noise signals. More specifically, statistics regarding the signals from the touch screen can be used to create a touch threshold that changes with the statistics of the signals. Accordingly, the threshold can automatically move higher in high noise situations and lower in low noise situations. So configured, fewer noise signals are erroneously interpreted as touches for the device associated with the touch screen. These and other benefits may become clearer upon making a thorough review and study of the following detailed description.

BRIEF DESCRIPTION OF THE DRAWINGS

The above needs are at least partially met through provision of the control for voltage regulators described in the following detailed description, particularly when studied in conjunction with the drawings wherein.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

Figure 1:
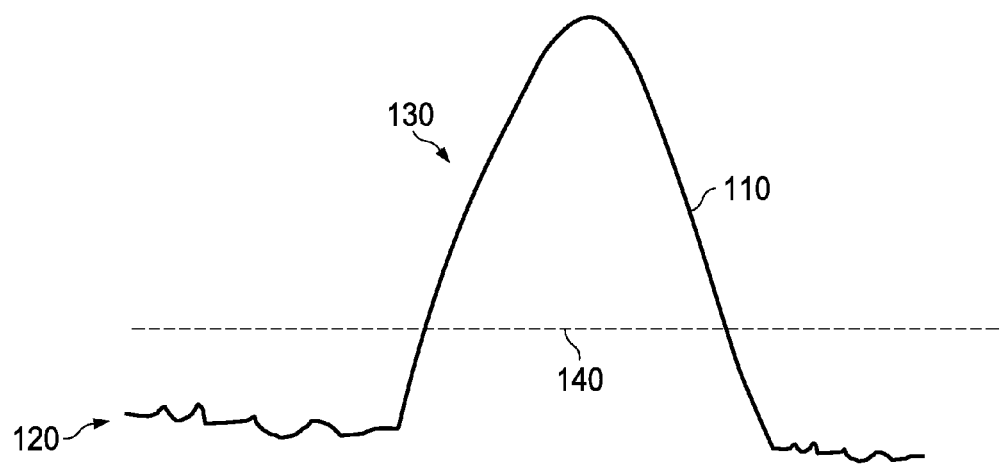
FIG. 1 comprises a graph illustrating a typical touch signal for a touch device relative to a fixed threshold level.
Figure 2:
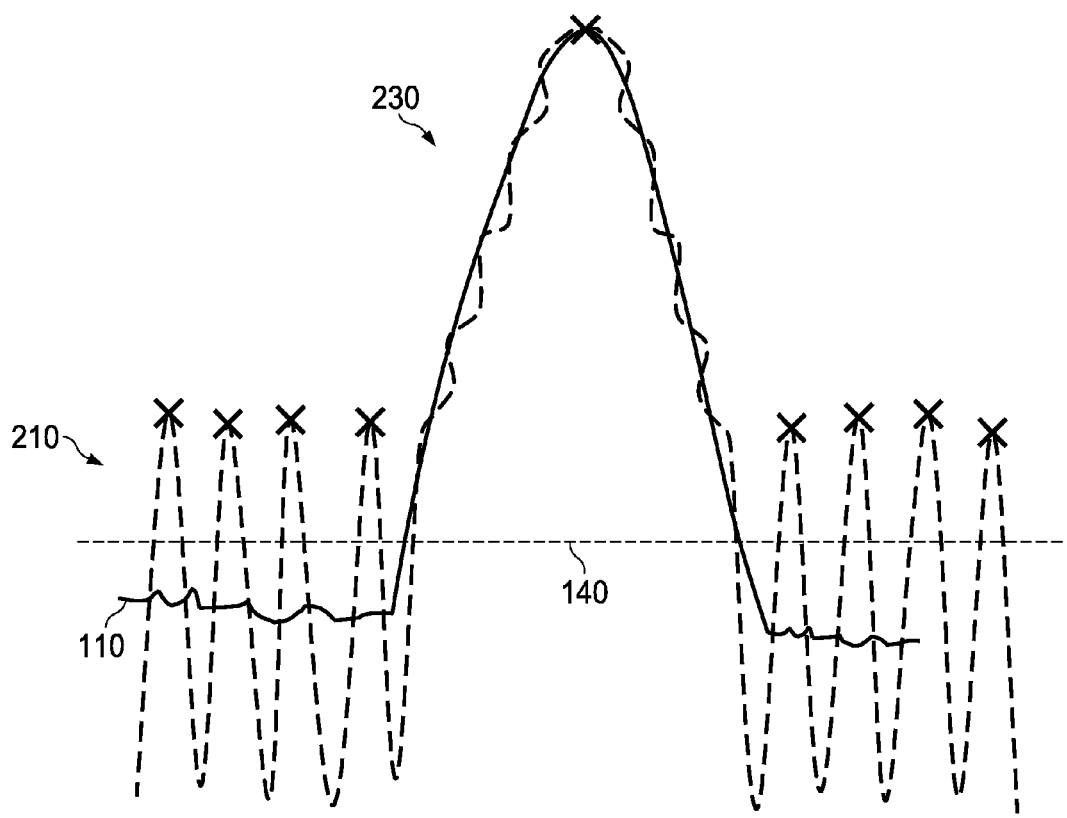
FIG. 2 comprises a graph illustrating a touch signal having a higher noise for a touch device relative to a fixed threshold level.
Figure 3:
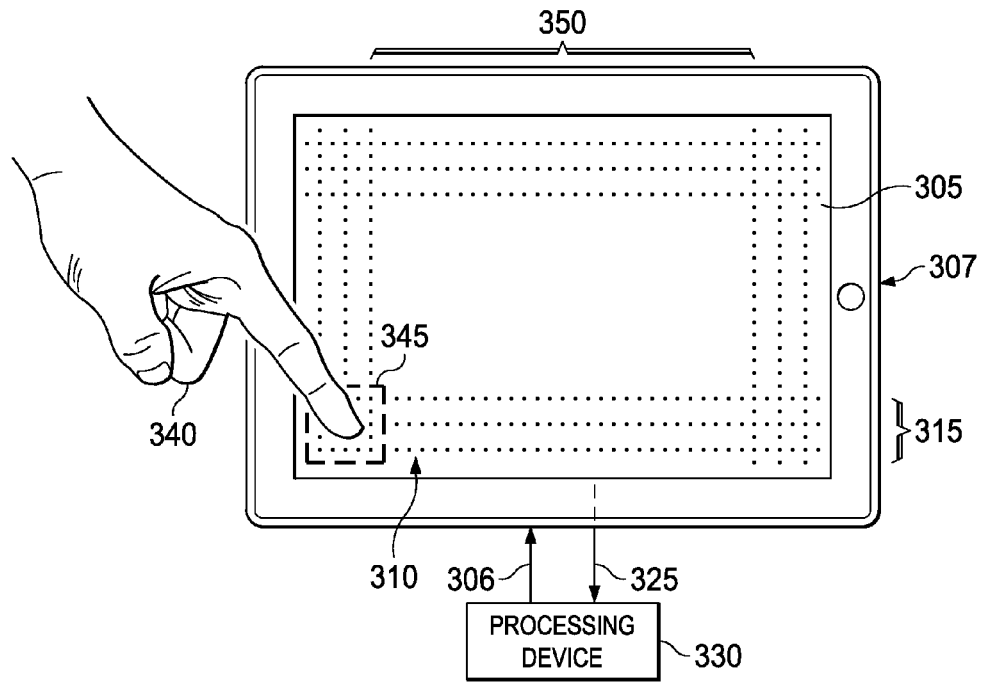
FIG. 3 comprises a conceptual diagram of a touch device having a touch screen being touched by an element as configured in accordance with various embodiments of the invention.
Figure 4:
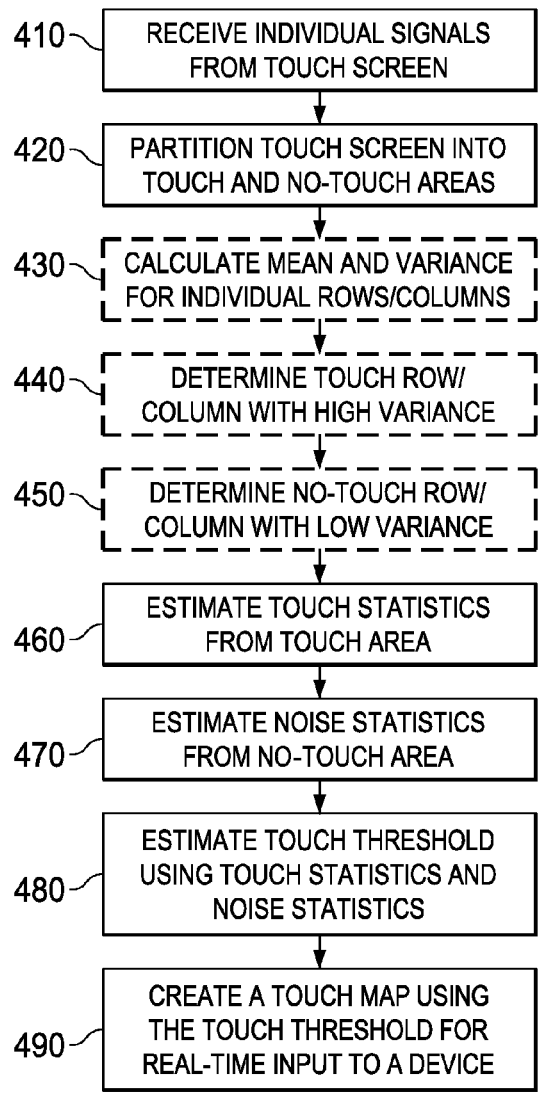
FIG. 4 comprises a flow diagram of an example method of operation for an apparatus configured in accordance with various embodiments of the invention.

Referring now to the drawings and, in particular, FIGS. 3 and 4, an example method and apparatus for adapting a signal threshold for detecting touches on a touch screen 305 for determining real-time input 306 for a corresponding device 307 will be described. As an initial matter, the touch screen 305 is partitioned into a two dimensional map 310 of pixels 315 corresponding to where sensors for the touch screen 305 create individual signals 325 from corresponding pixels 315 of the touch screen 305. The individual signals 325 correspond to whether a touch occurs on a surface of the touch screen 305 at the corresponding pixels 315. These signals 325 typically each include a magnitude related to the strength of touch gesture sensed at the pixel 315 and information correlating the magnitude to the corresponding pixel 315 so that the signals 325 can be understood in a map form (although it will be understood that the locating information can be obtained in other ways, for example, depending on the sensing technology used in the touch screen 305). A processing device 330 receives 410 those individual signals 325 and is configured to process the signals 325 to determine the input 306 for the associated device 307.

Those skilled in the art will recognize and appreciate that such a processor device 330 can comprise a fixed-purpose hard-wired platform or can comprise a partially or wholly programmable platform. The processing device 330 is typically built into the device 307 and is integrated with other processing aspects of the device 307, although it can be a separate and touch-screen dedicated processing device. All of these architectural options are well known and understood in the art and require no further description here.

When the touch screen 305 senses a touch by a touch device 340, such as a finger, stylus, or other element, the processing device 330 partitions the touch screen 305 into a touch area 345 and a no-touch area 350 based on the individual signals 325. In one example, the touch screen is partitioned by calculating 430 a mean signal value and a variance value for individual rows and/or individual columns of the pixels 315. More specifically, for a touch screen panel scan Z having N columns and M rows, the one-dimensional (1-D) mean and variance statistic vectors are calculated. For instance, the mean μ for a given column j of pixels is given by $$\mu_X(j) = \frac{1}{M}\sum_{i=1}^{M} Z(i, j) \text{ where}$$

$$\mu_X = [\mu_X(1)\mu_X(2) \ldots \mu_X(N)].$$

The variance σ (here in the form of standard deviation) for the given column j of pixels is given by $$\sigma_X(j)^2 = \frac{1}{M}\sum_{i=1}^{M}(Z(i, j) - \mu_X(j))^2$$

where $\delta^2 x = [\sigma^2 x(1)\sigma^2 x(2) \ldots \sigma^2 x(N)]$ For a given row i, these values are given by $$\mu_Y(i) = \frac{1}{N}\sum_{j=1}^{N} Z(i, j)$$

where $\mu_Y = [\mu_Y(1)\mu_Y(2) \ldots \mu_Y(M)]$ and $$\sigma_Y(i)^2 = \frac{1}{N}\sum_{j=1}^{N}(Z(i, j) - \mu_Y(i))^2$$

where $\sigma^2_Y = [\sigma^2_Y(1)\sigma^2_Y(2) \ldots \sigma^2_Y(M)]$. The same approaches can be applied to determine corresponding values for given rows i.

Figure 5:
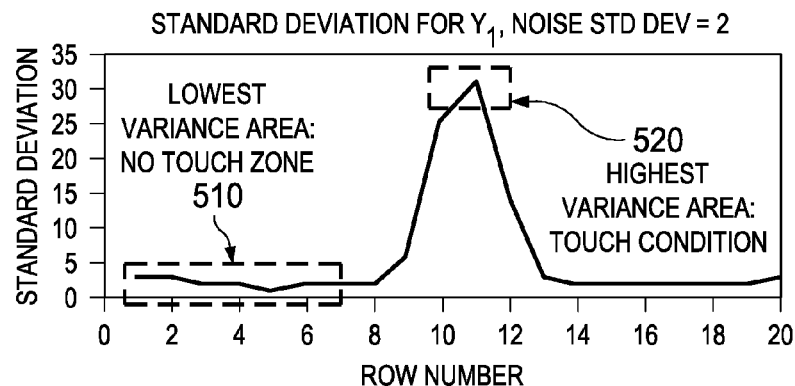
FIG. 5 comprises a graph illustrating an example set of variability data for a column of pixels for a touch screen configured in accordance with various embodiments of the invention.

An example of this calculation is illustrated in FIG. 5, which graphs a set of variances in a column direction. The first portion 510 of the line illustrates a set of rows having low variance values. Because there is not much variance across these rows, there is likely no touch in that area because it is very unlikely to have a consistent touch signal all the way across a whole row or column. In contrast, the rows 520 having a high variance are likely to have a high variance (in this example, around row 11) because many of the pixels of these rows will have low signals indicating no touch and several high signals corresponding to the touch screen portion being touched. In this way, variance can be an indicator of likely touch (rows/columns with high variance) and no-touch (rows/columns with low variance) areas.

Accordingly, the processing device 330 determines 440 a touch row and/or a touch column as having a highest or near highest variance and determines 450 a no-touch row and/or a no-touch column as having a lowest or near lowest variance. With the touch and no-touch areas so determined, the processing device 330 estimates touch statistics 460 corresponding to the touch area 345 and noise statistics 470 corresponding to the no-touch area 350. For the touch area 345, for example, the processing device 330 can determine a touch maximum signal value for the touch row and/or the touch column. For the no-touch area 350, for example, the processing device 330 can determine a no-touch average signal value for the no-touch row and/or the no-touch column and determine a no-touch variance value for the no-touch row and/or the no-touch column. The processing device 330 can then use the touch statistics and the noise statistics to estimate 480 the touch threshold that is used to create 490 the touch map for determining whether a given individual signal should be considered a touch on the touch screen 305 to be considered a real-time input 306 to the device 307 by ignoring individual signals less than the touch threshold, for example.

Figure 6:
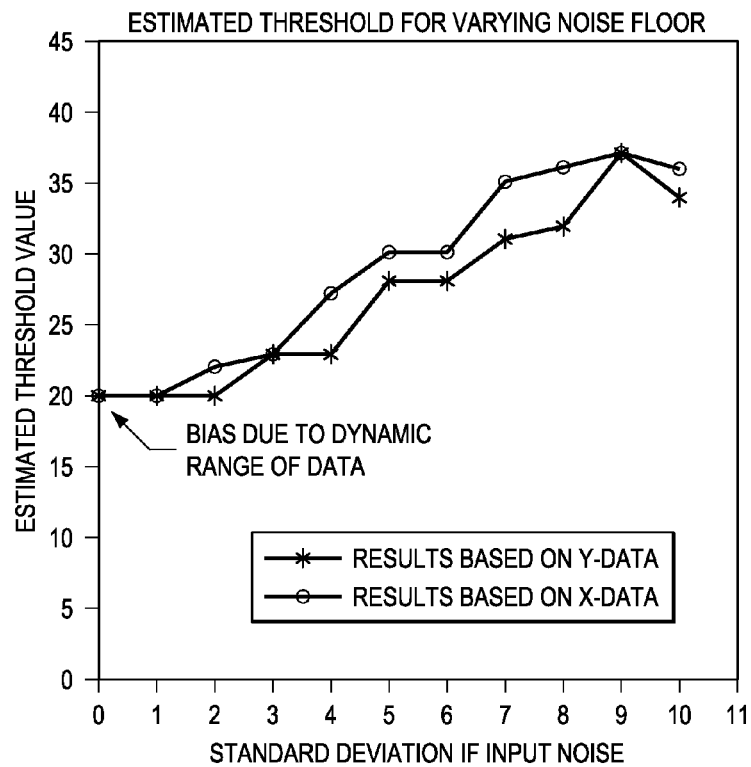
FIG. 6 comprises a graph illustrating an example variable threshold moving with noise in the touch screen as configured in accordance with various embodiments of the invention.

In one approach, the processing device 330 estimates 480 the touch threshold by determining a dynamic range for the touch screen by subtracting the no-touch average signal value from the touch maximum signal value and determining the touch threshold according to a function of the no-touch average signal value, the no-touch variance value, and the dynamic range. The dynamic range determination can be used to determine validity of the data; in other words, a dynamic range minimum value can be set such that the values can be thrown out if the dynamic range does not exceed the minimum value. If the dynamic range is sufficiently high, the touch threshold can be determined using the touch signal statistics in a number of ways. In one example, the adaptive threshold K is determined using the equation $K=\hat{\mu}+\alpha*\hat{\sigma}^2+\beta*DR$ where $\alpha$ is a tunable constant for noise variability, $\beta$ is a tunable constant for the dynamic range, $\mu$ is the estimated mean of the noise, and DR is the estimated dynamic range. In practice, the noise variability constant $\alpha$ is set around 0.2 (20% of DR). FIG. 6 illustrates how with this approach the adaptive threshold value increases with increasing noise.

Other functions can also be used. For example, the logarithm of DR and/or noise variance could be used. Although this would require more computation, such changes could be more effective in some settings. The threshold can also be estimated based on the statistics alone. In another instance, the threshold can be estimated as a function of the mean of the mean vector, the mean of the variance vector, and a minimum threshold. One such approach is represented by the equation: $K=K_{min}+\alpha*\sqrt{var\_mean}+g(mu\_mean)$ where $K_{min}$ is a fixed minimum threshold and g is a function of the mean of the mean vector. It can be a nonlinear function like quantization or a linear function.

Figure 7:
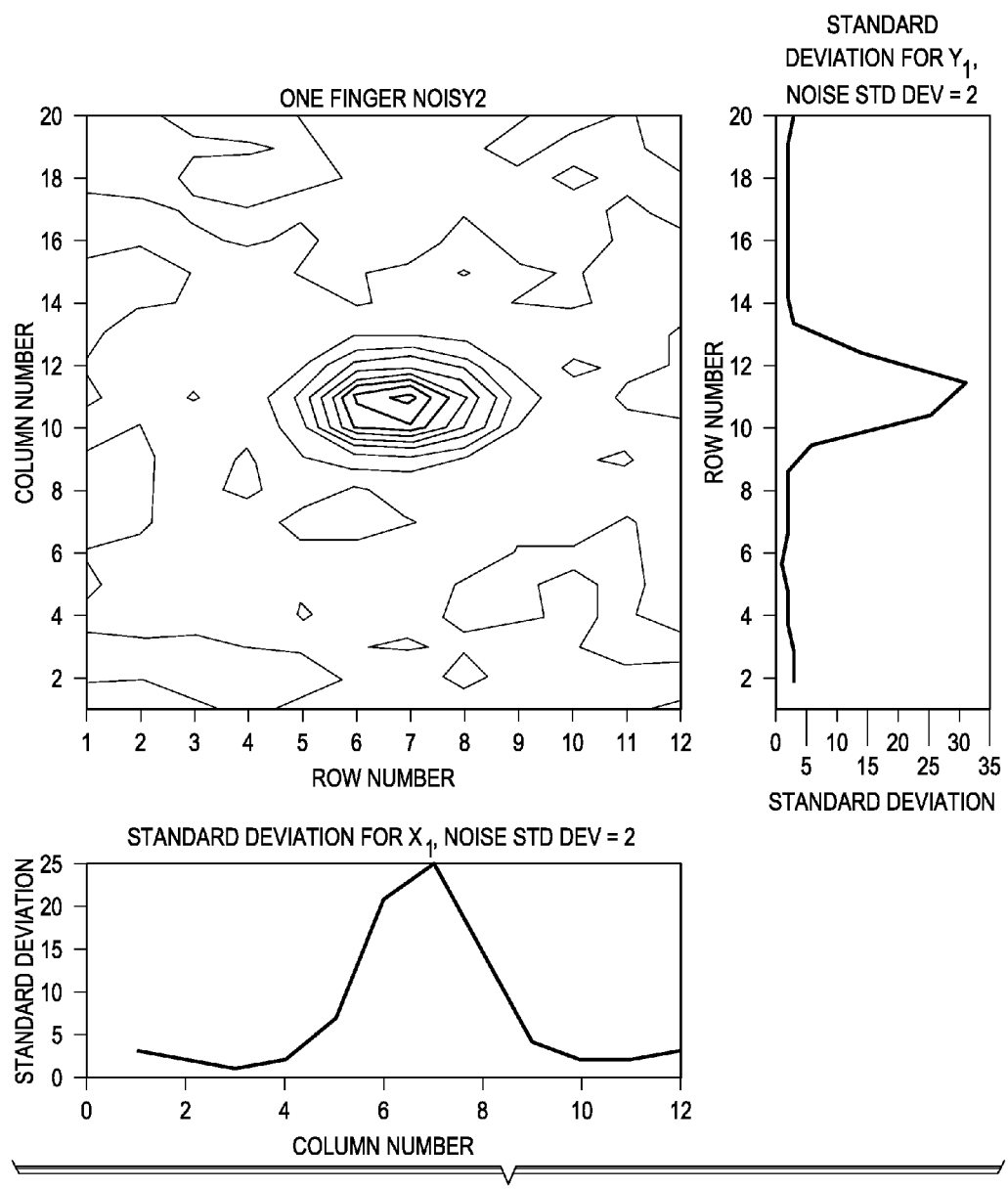
FIG. 7 comprises a graph illustrating an example map of individual signals for a touch screen with graphs showing variability statistics for corresponding rows and columns of the touch screen as configured in accordance with various embodiments of the invention.

Examples of the implementation of the variable and adaptable threshold will be described with respect to FIGS. 7-16. First, FIG. 7 illustrates a map of the individual signals created during a touch near the middle of a touch screen together with variability maps of the rows and columns. The variability maps plainly show the variability of the corresponding rows and columns with low variability (labeled here as the standard deviation) in the no-touch areas and high variability corresponding to the touch area despite a noise floor having an overall variability of about two standard deviations.

Figure 8:
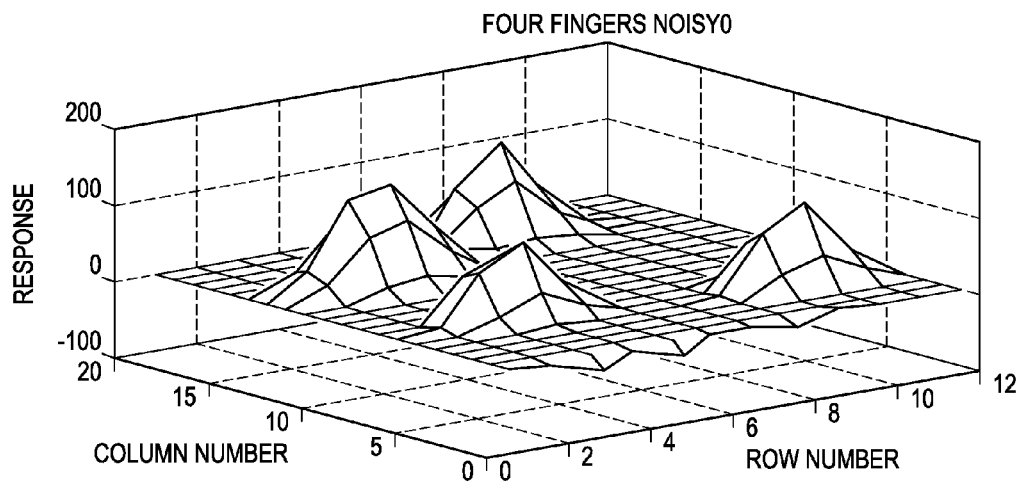
FIG. 8 comprises a three dimensional graph of an example map of individual signals for a touch screen touched by four fingers.
Figure 9:
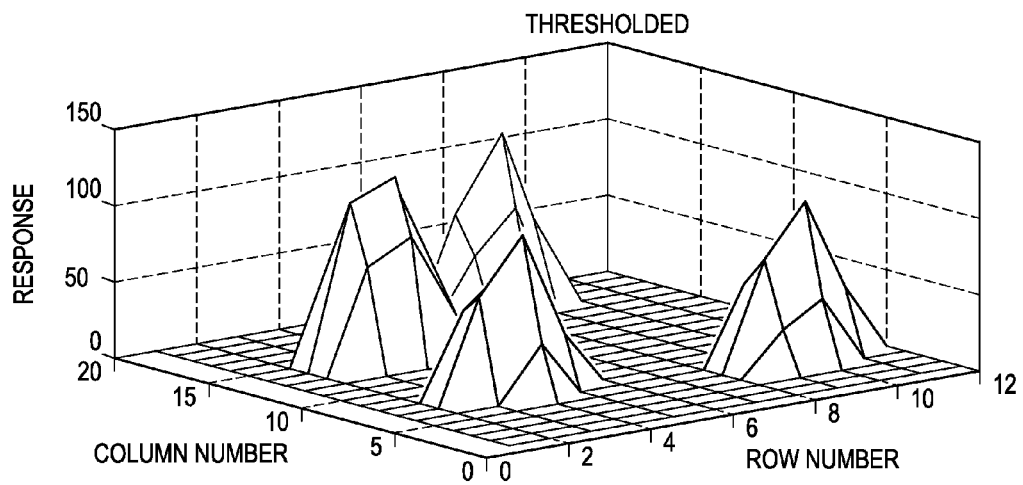
FIG. 9 comprises a three dimensional graph of an example touch map generated from the individual signals mapped in FIG. 8 in accordance with various embodiments of the invention.
Figure 10:
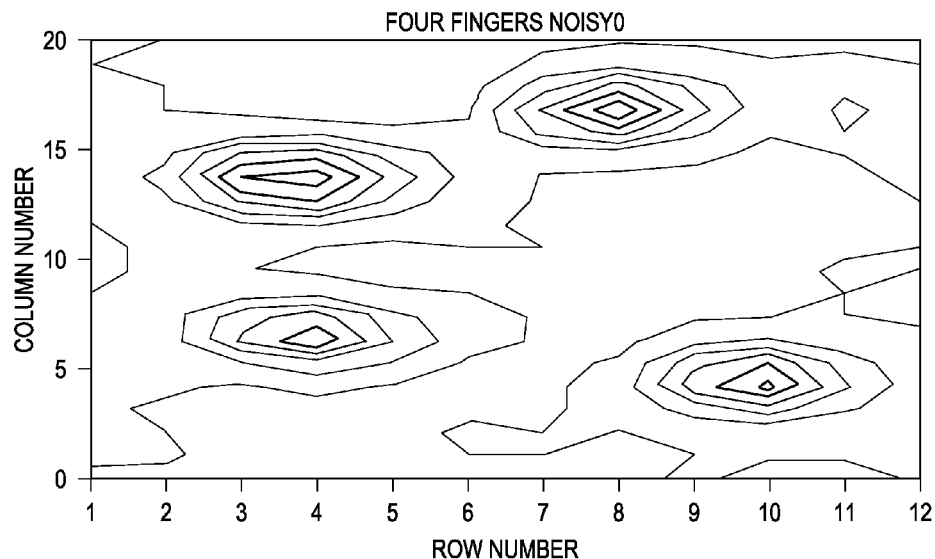
FIG. 10 comprises a two dimensional graph of the individual signals mapped in FIG. 8.
Figure 11:
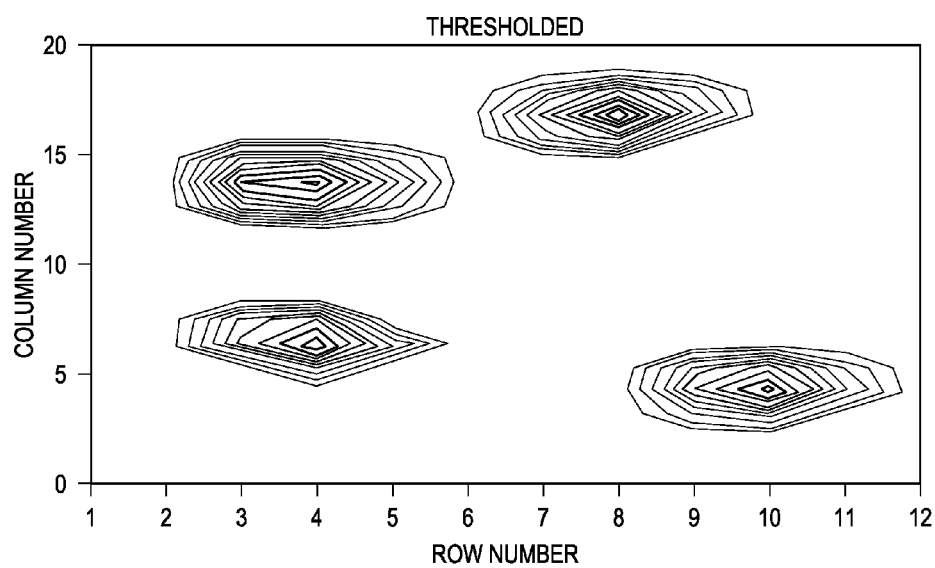
FIG. 11 comprises a two dimensional graph of the touch map of in FIG. 9.

FIG. 8 illustrates the individual pixel signals for a four finger touch on a touch screen, and FIG. 9 illustrates the corresponding touch map after applying an adaptive threshold, which application results in the illustrated the increased touch signal to noise separation. FIGS. 10 and 11 illustrate two-dimensional illustrations of the same data, which further illustrates the noise suppression of this approach.

Figure 12:
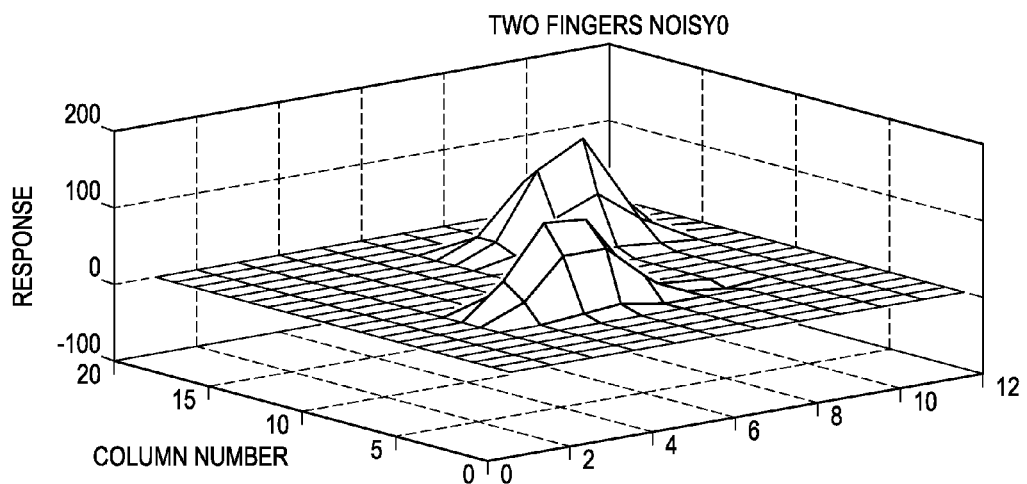
FIG. 12 comprises a three dimensional graph of an example map of individual signals for a touch screen touched by a finger and a stylus.
Figure 13:
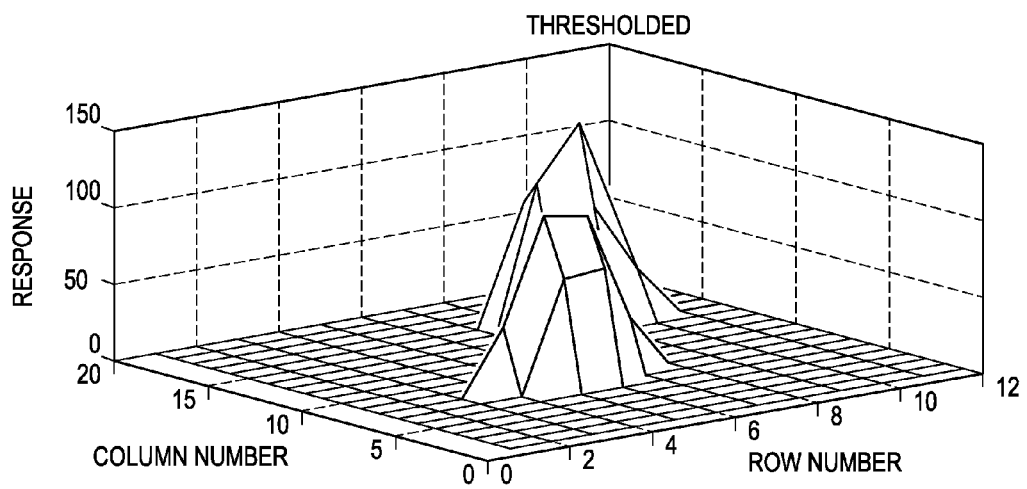
FIG. 13 comprises a three dimensional graph of an example touch map generated from the individual signals mapped in FIG. 12 in accordance with various embodiments of the invention.
Figure 14:
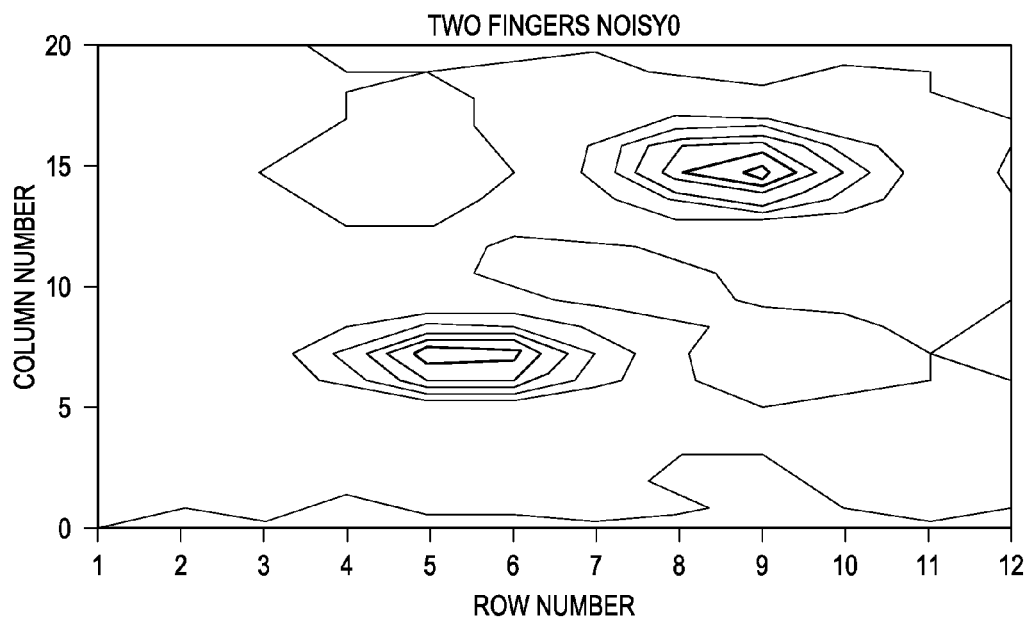
FIG. 14 comprises a two dimensional graph of the individual signals mapped in FIG. 12.
Figure 15:
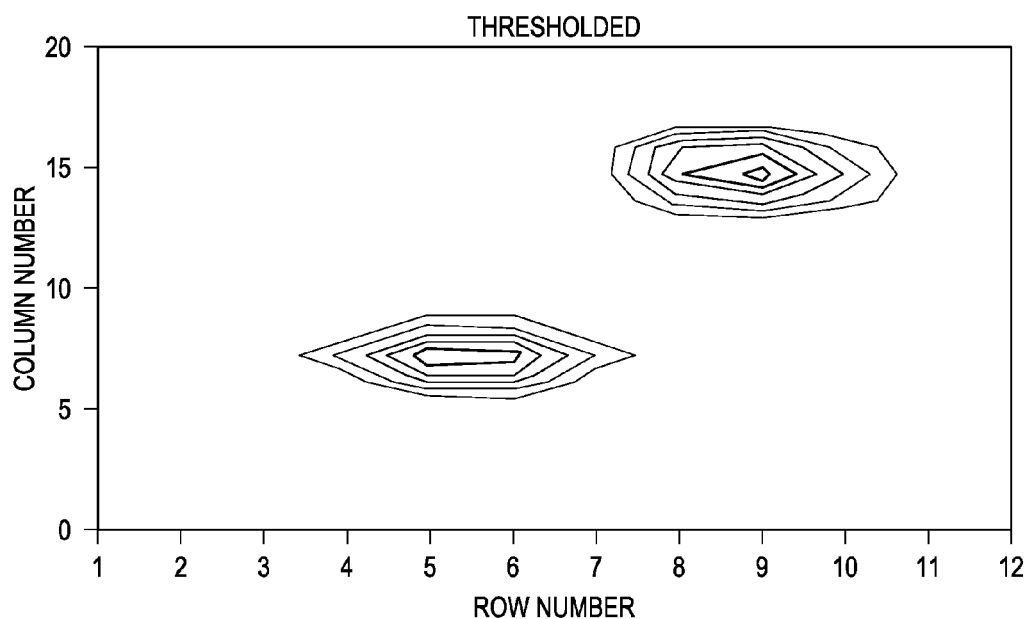
FIG. 15 comprises a two dimensional graph of the touch map of in FIG. 13.

FIG. 12 illustrates the individual pixel signals for a finger and stylus touch on a touch screen, and FIG. 13 illustrates the corresponding touch map after applying an adaptive threshold, which application again results in the illustrated increased touch signal to noise separation. FIGS. 14 and 15 illustrate two-dimensional illustrations of the same data, which further illustrates the noise suppression and improved clarity of the touch areas (such as of the diamond shaped stylus touch) when using of this approach.

Figure 16:
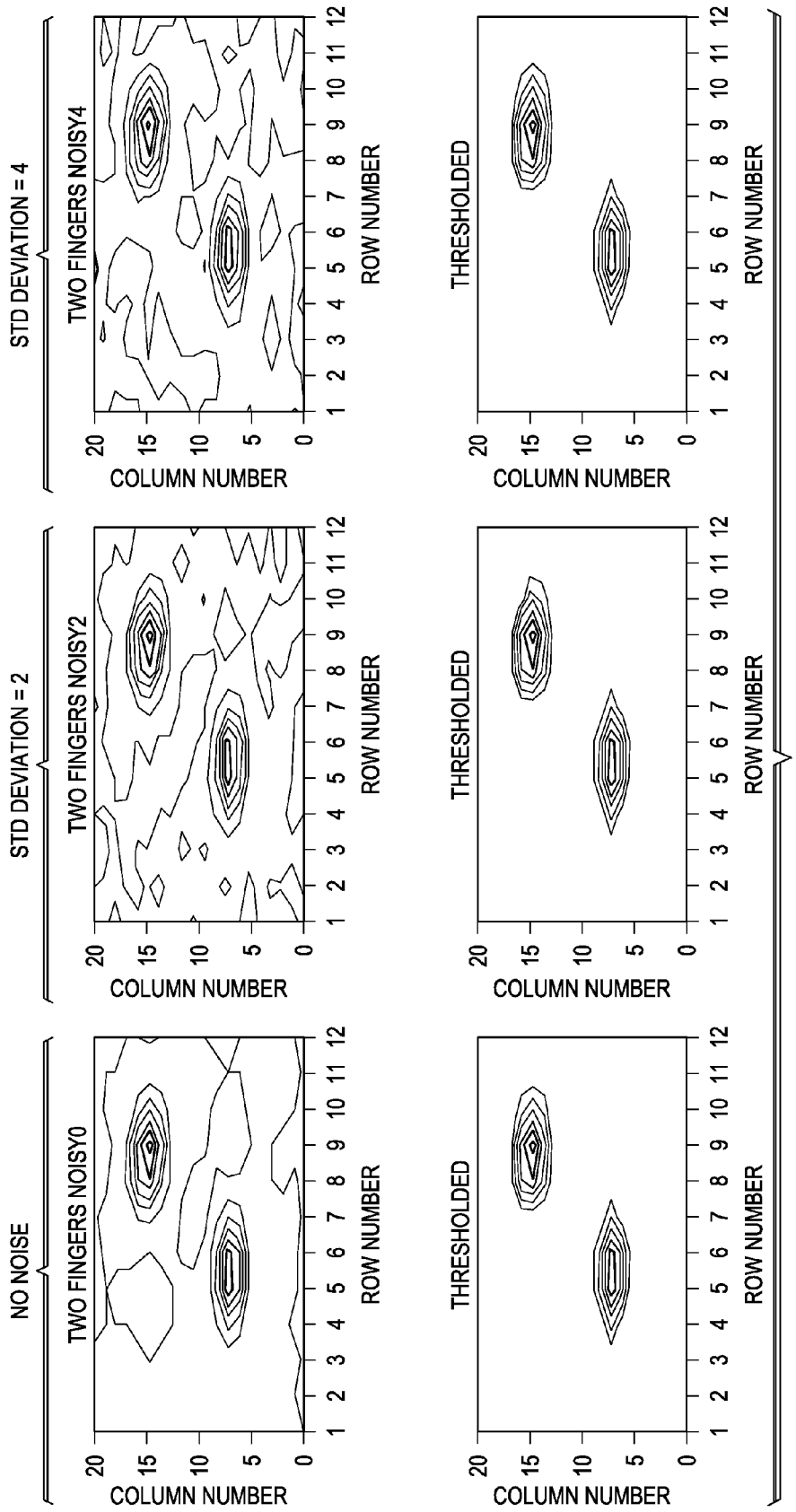
FIG. 16 comprises graphs showing an example map of individual signals for a touch screen touched by two fingers with corresponding touch map generated from the individual signals with increasing noise applied to the individual signals.

FIG. 16 further illustrates the ability of this approach to filter out increasing noise levels. These graphs show the same two-touch signals with increasing amounts of artificially imposed noise applied to the individual signals from the pixels. Despite the increased imposed noise from zero, to two standard deviations, and to four standard deviations, very nearly the same touch map is output through application of the adaptive threshold. So configured, touch signals can be more accurately interpreted as real-time input signals despite an increased noise level that might otherwise decrease performance of the touch screen.

Those skilled in the art will recognize that a wide variety of modifications, alterations, and combinations can be made with respect to the above described embodiments without departing from the scope of the invention. Such modifications, alterations, and combinations are to be viewed as being within the ambient of the inventive concept.

What is claimed is:

1. An apparatus for detecting a touch on a touch screen, the apparatus comprising:
a processing device configured to connect to receive individual signals from a touch screen configured to provide the individual signals from corresponding pixels of the touch screen, wherein the individual signals correspond to whether a touch occurs on a surface of the touch screen at the corresponding pixels, wherein the processing device is configured to:
partition the touch screen into a touch area and a no-touch area based on the individual signals,
estimate touch statistics corresponding to the touch area,
estimate noise statistics corresponding to the no-touch area,
estimate a touch threshold using the touch statistics and the noise statistics,
create a touch map using the touch threshold, wherein the touch map is configured to indicate specific portions of the touch screen that are touched for use as a real-time input signal for a device associated with the touch screen.

2. The apparatus of claim 1 wherein the processing device is configured to partition the touch screen into the touch area and the no-touch area by:
calculating a mean signal value and a variance value for individual rows and/or individual columns of the pixels;
determining a touch row and/or a touch column as having a highest or near highest variance;
determining a no-touch row and/or a no-touch column as having a lowest or near lowest variance.

3. The apparatus of claim 2 wherein the processing device is configured to estimate the touch statistics corresponding to the touch area by:
determining a touch maximum signal value for the touch row and/or the touch column.

4. The apparatus of claim 3 wherein the processing device is configured to estimate the no-touch statistics corresponding to the no-touch area by:
determining a no-touch average signal value for the no-touch row and/or the no-touch column;
determining a no-touch variance value for the no-touch row and/or the no-touch column.

5. The apparatus of claim 4 wherein the processing device is configured to estimate the touch threshold by:
determining a dynamic range for the touch screen by subtracting the no-touch average signal value from the touch maximum signal value;
determining the touch threshold according to a function of the no-touch average signal value, the no-touch variance value, and the dynamic range.

6. The apparatus of claim 1 wherein the processing device is configured to create the touch map by ignoring individual signals less than the touch threshold.

7. A method of detecting a touch signal on a touch screen, the method comprising:
creating individual signals from corresponding pixels of the touch screen, wherein the individual signals correspond to whether a touch occurs on a surface of the touch screen at the corresponding pixels;
using a processing device connected to receive the individual signals to:
partition the touch screen into a touch area and a no-touch area based on the individual signals,
estimate touch statistics corresponding to the touch area,
estimate noise statistics corresponding to the no-touch area,
estimate a touch threshold using the touch statistics and the noise statistics,
create a touch map using the touch threshold, use the touch map to indicate specific portions of the touch screen that are touched for use as a real-time input signal for a device associated with the touch screen.

8. The method of claim 7 wherein the partitioning the touch screen into the touch area and the no-touch area comprises:
   calculating a mean signal value and a variance value for individual rows and/or individual columns of the pixels;
   determining a touch row and/or a touch column as having a highest or near highest variance;
   determining a no-touch row and/or a no-touch column as having a lowest or near lowest variance.

9. The method of claim 8 wherein the estimating the touch statistics corresponding to the touch area comprises:
   determining a touch maximum signal value for the touch row and/or the touch column.

10. The method of claim 9 wherein the estimating the no-touch statistics corresponding to the no-touch area comprises:
   determining a no-touch average signal value for the no-touch row and/or the no-touch column;
   determining a no-touch variance value for the no-touch row and/or the no-touch column.

11. The method of claim 10 wherein the estimating the touch threshold comprises:
   determining a dynamic range for the touch screen by subtracting the no-touch average signal value from the touch maximum signal value;
   determining the touch threshold according to a function of the no-touch average signal value, the no-touch variance value, and the dynamic range.

12. The method of claim 7 wherein the creating the touch map comprises ignoring individual signals less than the touch threshold.

13. An apparatus for detecting a touch on a touch screen, the apparatus comprising:
   a touch screen configured to provide individual signals from corresponding pixels of the touch screen, wherein the individual signals correspond to whether a touch occurs on a surface of the touch screen at the corresponding pixels;
   a processing device configured to connect to receive the individual signals from the touch screen, wherein the processing device is configured to:
      calculate a mean signal value and a variance value for individual rows and/or individual columns of the pixels;
      determine a touch row and/or a touch column as having a highest or near highest variance;
      determine a no-touch row and/or a no-touch column as having a lowest or near lowest variance,
      estimate touch statistics corresponding to the touch area by determining a touch maximum signal value for the touch row and/or the touch column,
      estimate noise statistics corresponding to the no-touch area by determining a no-touch average signal value for the no-touch row and/or the no-touch column and determining a no-touch variance value for the no-touch row and/or the no-touch column,
      estimate a touch threshold using the touch statistics and the noise statistics by:
         determining a dynamic range for the touch screen by subtracting the no-touch average signal value from the touch maximum signal value, and
         determining the touch threshold according to a function of the no-touch average signal value, the no-touch variance value, and the dynamic range,
      create a touch map using the touch threshold by ignoring individual signals less than the touch threshold, wherein the touch map is configured to indicate specific portions of the touch screen that are touched for use as a real-time input signal for a device associated with the touch screen.

* * * * *